(12) United States Patent
Noureddine

(10) Patent No.: US 8,007,208 B2
(45) Date of Patent: Aug. 30, 2011

(54) TOOL SYSTEM

(75) Inventor: Hassan Noureddine, Nehren (DE)

(73) Assignee: Hartmetall-Werkzeugfabrik Paul Horn GmbH, Tubingen (DE)

( * ) Notice: Subject to any disclaimer, the term of this patent is extended or adjusted under 35 U.S.C. 154(b) by 410 days.

(21) Appl. No.: 12/361,051

(22) Filed: Jan. 28, 2009

(65) Prior Publication Data
US 2009/0185873 A1 Jul. 23, 2009

Related U.S. Application Data

(63) Continuation of application No. PCT/EP2007/006661, filed on Jul. 27, 2007.

(51) Int. Cl.
*B23B 27/16* (2006.01)
*B23C 5/20* (2006.01)

(52) U.S. Cl. .......................... 407/47; 407/103

(58) Field of Classification Search ............. 407/47, 407/48, 102–104, 13, 15
See application file for complete search history.

(56) References Cited

U.S. PATENT DOCUMENTS

| | | | | |
|---|---|---|---|---|
| 4,087,194 A * | 5/1978 | Takacs et al. | .................. | 408/199 |
| 4,190,388 A * | 2/1980 | Mullane et al. | ............... | 408/188 |
| 4,557,639 A * | 12/1985 | Fischer | ........................... | 407/20 |
| 5,647,699 A * | 7/1997 | Martin et al. | .................... | 407/33 |
| 5,702,210 A * | 12/1997 | Boianjiu | ........................ | 407/100 |
| 5,833,403 A * | 11/1998 | Barazani | ....................... | 407/101 |
| 6,132,146 A | 10/2000 | Satran et al. | | |
| 6,273,649 B1 * | 8/2001 | Ziegler | ........................ | 407/101 |
| 6,273,650 B1 * | 8/2001 | Jordberg | ...................... | 407/102 |
| 7,001,114 B2 * | 2/2006 | Blucher et al. | ................ | 407/103 |
| 7,121,768 B2 * | 10/2006 | Hole et al. | ...................... | 407/11 |
| 7,249,917 B2 * | 7/2007 | Wilson | ........................... | 408/181 |
| 7,641,423 B2 * | 1/2010 | Blucher et al. | ................. | 407/66 |
| 7,908,945 B2 * | 3/2011 | Dufour et al. | .................. | 82/1.11 |
| 2002/0094245 A1 * | 7/2002 | Schlemmer et al. | ........... | 407/66 |
| 2004/0151551 A1 | 8/2004 | Oettle | | |
| 2009/0196698 A1 * | 8/2009 | Noureddine | .................... | 408/59 |
| 2011/0008115 A1 * | 1/2011 | Chen | ............................... | 407/46 |

FOREIGN PATENT DOCUMENTS

| | | |
|---|---|---|
| DE | 3402547 A1 * | 8/1985 |
| DE | 34 48 086 C2 | 12/1991 |
| DE | 92 03 373.3 | 6/1992 |
| DE | 299 11 894 U1 | 10/1999 |
| EP | 0 767 023 A1 | 4/1997 |
| EP | 1 080 812 A2 | 7/2001 |
| JP | 07237006 A * | 9/1995 |
| JP | 11245105 A * | 9/1999 |
| JP | 2002178203 A * | 6/2002 |
| JP | 2004255468 A * | 9/2004 |
| JP | 2005034911 A * | 2/2005 |
| JP | 2006263845 A * | 10/2006 |
| JP | 2010179380 A * | 8/2010 |
| WO | 94/15741 | 7/1994 |
| WO | 00/02692 | 1/2000 |

* cited by examiner

*Primary Examiner* — Boyer D Ashley
*Assistant Examiner* — Sara Addisu
(74) *Attorney, Agent, or Firm* — Turocy & Watson, LLP

(57) ABSTRACT

A tool system comprising a holder and a cutting tool having a tool cutting edge and a fixing part, wherein the tool cutting edge projects by a predeterminable projecting length beyond the holder for a machining operation, is characterized in that the holder is provided at the outer circumference with a supporting part which projects in the direction of the projecting length of the tool cutting edge and forms a supporting surface for at least partial abutment of the cutting tool.

12 Claims, 4 Drawing Sheets

TOOL SYSTEM

CROSS-REFERENCE TO RELATED APPLICATIONS

This is a continuation application of international patent application PCT/EP2007/006661, filed on Jul. 27, 2007, designating the United States and published in German as WO 2008/014932 A1, which claims priority to German application No. 10 2006 035 182, filed on Jul. 29, 2006, the entireties of which are hereby incorporated by reference.

BACKGROUND OF THE INVENTION

1. Field of the Invention

The invention relates to a tool system comprising a holder and a cutting tool that has a tool cutter and a fixing part.

2. Related Prior Art

Known in the prior art are tool systems for metal machining that, acting in combination with a rotating drive spindle or a non-rotating machine support, constitute a rotating or non-rotating machining tool. For example, DE 34 48 086 C2 discloses a tool for internal machining. When combined with a machine tool that imparts a translational motion to the holder, such tool systems can also be used as a broaching tool.

Normally, such tool systems, preferably comprising a cutting tool composed of a hard metal material, are used for machining operations that are to be performed with high precision. In order to ensure conformity with correspondingly close tolerances and to achieve a high quality of the respectively machined workpiece surfaces, secure and rigid fastening of the cutting tool to the holder is of crucial importance, it being necessary to ensure that cutting forces acting upon the fixing part via the tool cutter do not result in deviations of the centering or positioning of the cutting tool. The known tool systems do not adequately fulfill this requirement. Since it is necessary for a projecting length beyond the holder to be provided for the tool cutter in order to enable chip-removing machining to be effected in regions located outside of the contour of the holder, the cutting force acts at a location in the system that projects relative to the holder, as a result of which there occur at the fixing part of the cutting tool forces and moments that impair rigid and secure fixing.

Accordingly, in order to avoid such disadvantages in the case of a tool system of the generic type, it has already been proposed, in the German utility model 299 11 894 U1, that the tool cutter, for the purpose of chip-removing machining, be left projecting beyond the holder of the tool system by a predefinable projecting length, the holder being provided, on its outer circumference, with a supporting part that projects in the direction of the projecting length of the tool cutter and constitutes a supporting surface for at least partial bearing contact of the cutting tool. In the case of the known solution, the holder has the shape of a shank that defines a longitudinal axis, said supporting part being constituted by a supporting body that projects radially, relative to the longitudinal axis, from the circumferential surface of the shank and is realized as a single piece with the latter, and the shank, in turn, constituting, at least at its free end, a recess as a seat for receiving a fixing part of the cutting tool, which recess is open at the end face of the shank and on the circumference of the shank. In the case of the known solution, cutting bodies, as cutting tools, are mounted in a distributed manner in various cutting planes and in a plurality of identically realized receivers of the holder, the respective cutting tool having full-surface support on a recess base, extending in the form of an arc or flute, as a seat in the holder for chip-removing machining. It is not possible in such a manner to preclude the occurrence of static redundancy in the fixing of the tool in the receiver, which could impair the machining accuracy. In addition, owing to the multiplicity of cutting tools used, a particularly stiff overall design of the tool system is almost unachievable with the special arcuate mounting provided for said cutting tools, which again can disadvantageously affect the machining accuracy.

SUMMARY OF THE INVENTION

With regard thereto, the object of the invention is to make available a tool system that, realized inexpensively, ensures that the cutting tool is fixed to the holder in a manner that is particularly rigid and secure against large loads.

According to the invention, this object is achieved by a tool system comprising a holder and a cutting tool that has a tool cutter and a fixing part, the tool cutter, for the purpose of chip-removing machining, projecting beyond the outer circumference of the holder by a predefinable projecting length, the holder being provided, on its outer circumference, with a supporting part that projects in the direction of the projecting length of the tool cutter and constitutes a supporting surface for at least partial bearing contact of the cutting tool, the holder having the shape of a shank that defines a longitudinal axis, the supporting part being constituted by a supporting body that projects radially, relative to the longitudinal axis, from the circumferential surface of the shank and is realized as a single piece with the latter, the shank constituting, at least at its free end, a recess as a seat for receiving a fixing part of the cutting tool, which recess is open at the end face of the shank and on the circumference of the shank, wherein the cutting tool, at least over the greater portion of the fixing part, has an overall wedge-shaped outline with side walls that, starting from a vertex region opposite the tool cutter, diverge in a V shape, wherein the seat of the holder, for the purpose of acting in combination with the side walls of the fixing part of the cutting tool, has side walls having a configuration that diverges radially outwards and, at least partially, likewise in a V shape from a recess base, and wherein the vertex region of the cutting tool is at a predefinable clear distance from the bottom of the recess base.

Since, according to the invention, the cutting tool, at least over the greater portion of the fixing part, has an overall wedge-shaped outline with side walls that, starting from a vertex region opposite the tool cutter, diverge in a V shape, the seat of the holder, for the purpose of acting in combination with the side walls of the fixing part of the cutting tool, has side walls having a configuration that diverges radially outwards and, at least partially, likewise in a V shape from a recess base, and the vertex region of the cutting tool is at a predefinable clear distance from the bottom of the recess base, the cutting tool is supported against the operating loads, not only within the circumferential region of the holder, but also in a region located outside of the circumferential region of the holder, i.e. at the location adjacent to the projecting tool cutter. Via the projecting supporting part, therefore, cutting forces and generated moments are introduced into the holder in immediate proximity to the working location, this being instrumental in reducing the load moments acting on the fixing part of the cutting tool.

Owing to the V-shaped design for the seat of the cutting tool, with the recess base of the seat leaving open a corresponding relief, static redundancy is avoided and, irrespective of the possible tolerance situation, the cutting tool adjusts automatically and in a positionally precise manner between the seat walls of the holder that diverge in a V shape. Since the recess base opposite the adjacent end of the cutting tool is cut with a clearance in the shape of the vertex region, static redundancy is avoided to this extent, and a functional tolerance equalization, in respect of the system composed of the holder and cutting tool, is created. Overall, the solution according to the invention achieves a very rigid, functionally reliable structure, which can be realized inexpensively. In such a manner, vibrations occurring during machining and introduced into the holder shank can, to a very large extent, be prevented or at least reliably controlled.

In the case of a preferred embodiment of the tool system according to the invention, provision is made whereby the radially outwardly diverging seat walls of the holder open out, in the direction of the longitudinal axis of same, into the recess base, which has an inner wall that is widened in comparison therewith, preferably extends in the form of an arc and is part of the bottom of the recess base. Owing to the opening to that effect in the form of the relieved recess base in the holder, in relation to the V shape of the connection solution a kind of pliers handle is realized between side walls and seat walls, rendering possible large holding and supporting forces. Preferably, provision is made in this case whereby the diameter of the arc for the recess base is selected to be greater than the clear entry cross-section into which the V-shaped seat walls open out into the recess base. Preferably, the included angle for the V shape is approximately 30 to 45 degrees.

In the case of further, particularly advantageous exemplary embodiments, the shank, at least at its free end, constitutes a solid of revolution, wherein a recess, which is open at the end face of the shank and on the circumference of the shank, constitutes a seat for receiving the fixing part of the cutting tool.

The arrangement in this case can be such that the supporting body adjoins the seat axially in such a way that its supporting surface facing towards the front end face of the shank constitutes a continuation of the rear end surface of the seat, which continuation projects beyond the circumference of the solid of revolution. The supporting body, together with the rear end surface of the seat, thus constitutes a continuous supporting surface for the cutting tool, which, via a flat bearing contact surface of its fixing part, can bear with positive bearing contact on the flat rear end surface of the seat and on the supporting surface of the supporting body, which supporting surface is a continuation of this end surface. In other words, a planar bearing contact is obtained, going out from the base of the recess to the radially outer end of the supporting body.

If the tool system is intended for machining in which there occur force components of the cutting force that act along the longitudinal axis, for example if the tool system is intended as a broaching tool, the bearing contact surface of the fixing part, the rear end surface of the seat and the supporting surface of the supporting body that adjoins the latter are preferably located in a radial plane.

In the case of particularly advantageous exemplary embodiments, the cutting tool has the shape of a block, preferably formed from a hard metal material, the cutter part of which constitutes a continuation of the fixing part, this continuation constituting the cutter part being shaped in such a way that it constitutes the projecting length of the tool cutter beyond the holder and the supporting body, and the continuation, via its end surface as part of the bearing contact surface, acting in combination with the supporting surface of the supporting body, and the tool cutter having at least one cutting edge that is located on or near the front side of the cutter part that faces towards the end face of the holder.

In this case there can be at least one main cutter, which extends, on the front side of the continuation, in a plane parallel to the supporting surface. In the case of translational motion of the holder, the system in this case constitutes a broaching tool.

For the purpose of expedient chip shaping, provision can be made in this case whereby the front side of the continuation that is opposite the rear end surface has, adjoining the main cutter, a cutting face having a slight curvature, which is so selected that the wanted chip flow is obtained, depending on the characteristics of the workpiece, the cutting conditions and the like.

In order to ensure optimum seat conditions, the arrangement is preferably such that the side walls of the fixing part of the cutting tool that act in combination with the seat walls have sub-regions deviating from the plane, a domed shaping, for example, being provided in the contact region between side walls and seat walls.

BRIEF DESCRIPTION OF THE DRAWING

The invention is explained in detail in the following with reference to the drawings, wherein.

DESCRIPTION OF A PREFERRED EMBODIMENT

Figure 1:
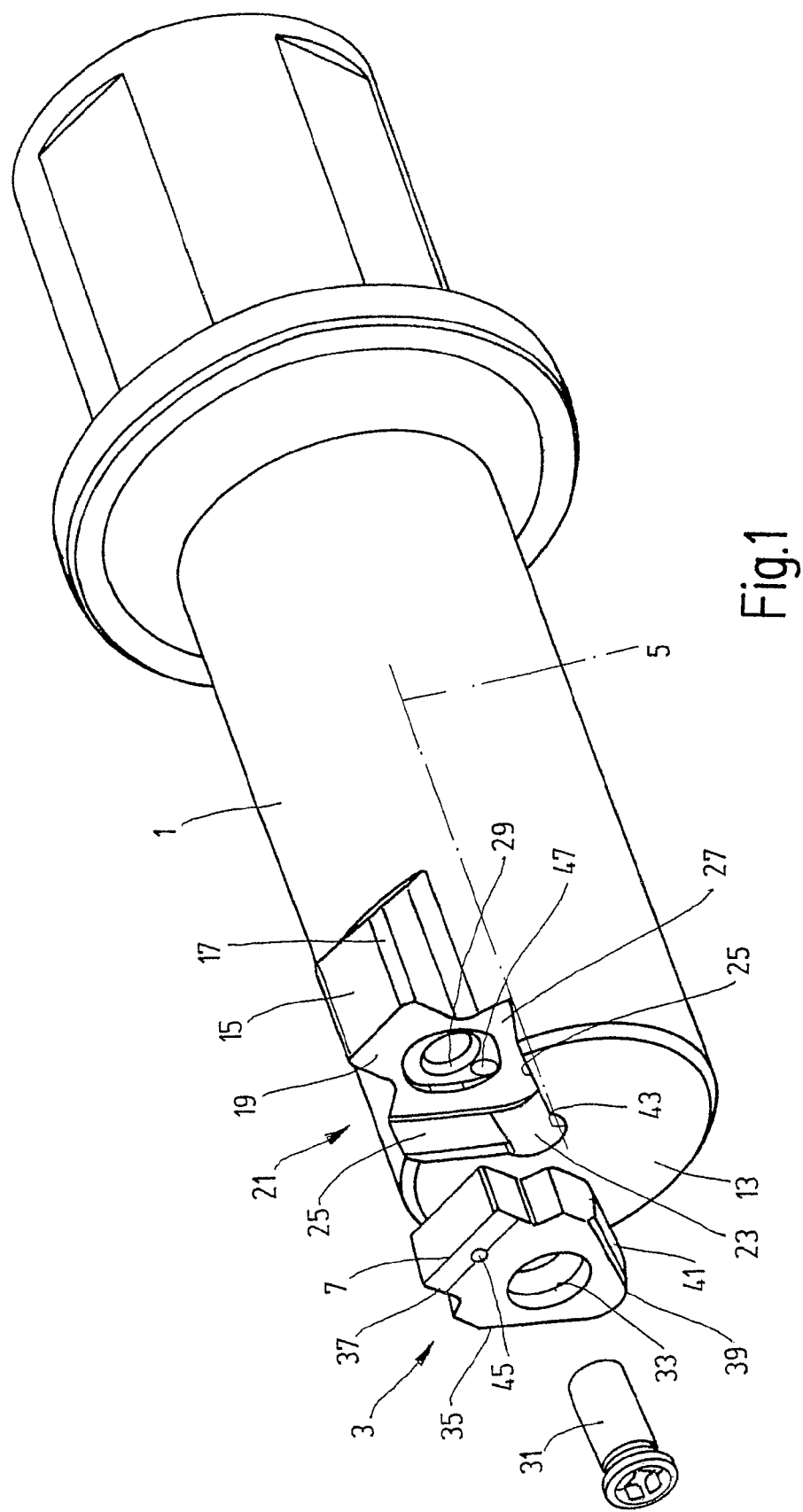
FIG. 1 shows, in an exploded drawing, a perspective oblique view of an exemplary embodiment of the tool system according to the invention.

The invention is explained in the following with reference to an exemplary embodiment in which the tool system constitutes a broaching tool, the holder 1, with the cutting tool 3 fixed to the front thereof, being moved in the direction of the holder longitudinal axis 5, in order to perform broaching machining on a workpiece, not shown, by means of a main cutter 7 of the cutting tool 3, the main cutter 7 extending perpendicularly in relation to the longitudinal axis 5. In the case of use as a broaching tool, a cutting or working force that is directed mostly along the longitudinal axis 5 is effective during the working operation. In the case of an alternative application of the tool system for turning machining or drilling machining, in which machining operations a chip-removing operation can be effected at cutters 9 and/or 11 located close to the main cutter 7, see FIG. 3, a force component is likewise produced along the longitudinal axis 5.

Figure 2:
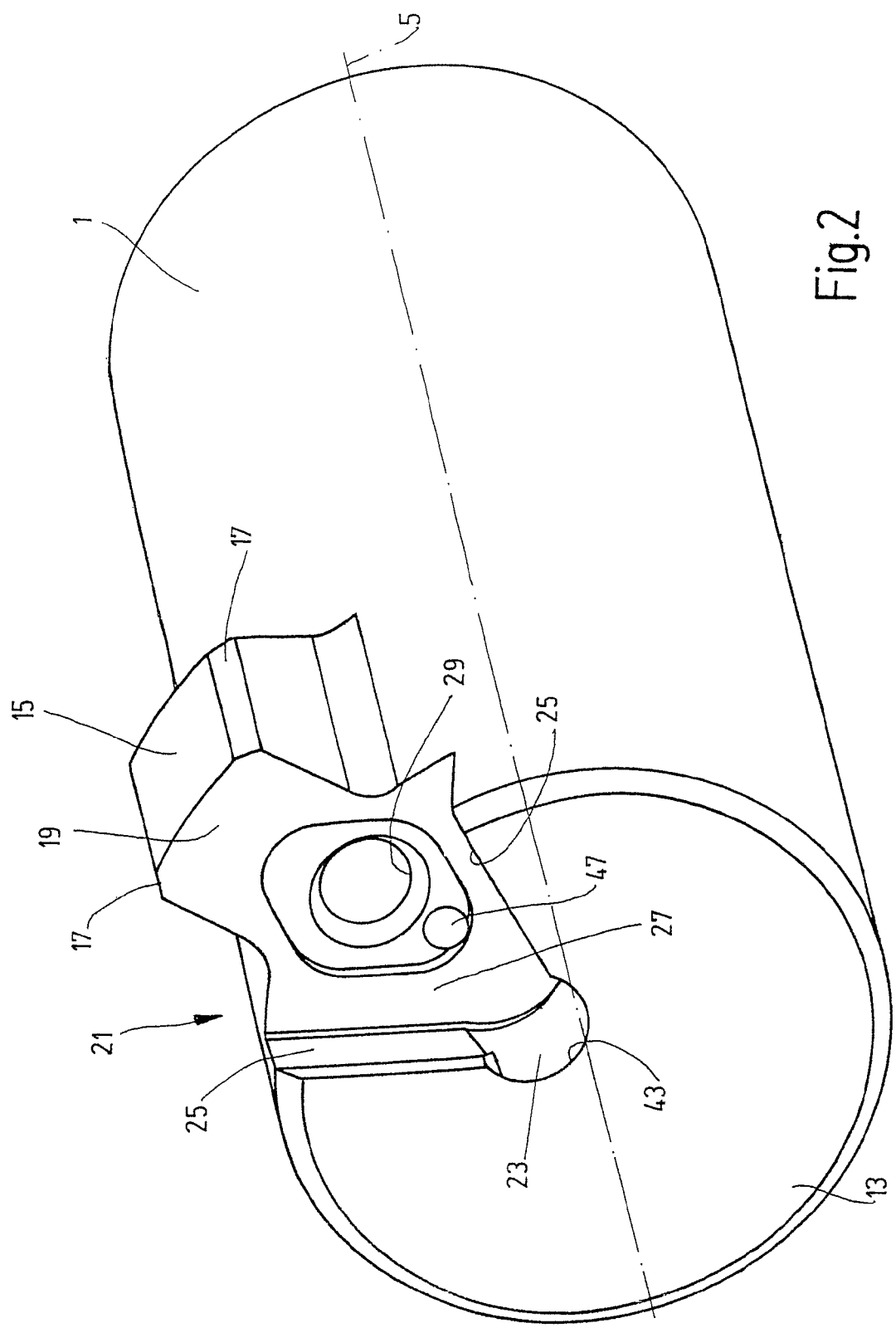
FIG. 2 shows, in a drawing enlarged in comparison with FIG. 1, a perspective oblique view of only the front end portion of the holder of the exemplary embodiment, without mounted cutting tool.

FIGS. 1 and 2 illustrate the support, provided in the case of the invention, of the cutting tool 3 on the holder 1, which has the shape of a shank constituting a solid of revolution, there being realized, projecting radially in proximity to the end face 13 of the holder 1, a supporting body 15 realized as a single piece with the latter. The supporting body 15 has the shape of a block, which is beveled slightly towards its upper or outer side and which, apart from its bevels 17, has an approximately square cross-section. On its side facing towards the end face 13, the supporting body 15 constitutes a flat supporting surface 19 lying in a radial plane. This supporting surface is at an axial distance from the front end face 13 of the holder 1, which distance corresponds to the axial extent of a seat 21, which is provided on the holder 1 and in which the cutting tool 3 can be received and fixed.

As can be seen from FIGS. 1 and 2, the seat 21 is constituted by a recess that is open at the end face 13 and on the circumference of the holder 1. This recess, starting from the recess base 23, which is located in the proximity of the longitudinal axis 5, has side walls 25, which, starting from the base 23 and diverging in relation to each other, extend towards the outer circumference of the holder 1. The receiving space of the seat 21 for the cutting tool 3 therefore has a V-shaped cross-section.

The rear end surface 27 of the seat 21 lies in a common plane with the supporting surface 19 of the supporting body 15, such that the supporting surface 19 constitutes a direct continuation of the rear end surface 27 of the seat 21. The cutting tool 3 fixed in the seat 21 is thus provided with a continuous, planar contact surface, which, through the supporting surface 19 of the supporting body 15, continues radially beyond the outer circumference of the holder 1.

The cutting tool 3 has, on its back side opposite the front cutter 7, a planar bearing contact surface that, when the cutting tool 3 has been received in the seat 21, bears positively on the rear end surface 25 and the radially continuing supporting surface 19. As can be seen from FIGS. 1 and 2, at the transition region between the end surface 27 and the supporting surface 19 there is a threaded bore 29 for a tensioning screw 31 in the form of a countersunk-head screw that engages in a through bore 33 in the cutting tool 3, by means of which screw the cutting tool 3 can be clamped in the seat 21, the fixing part 35 of the cutting tool 3 being in lateral bearing contact with the seat walls 25 via side walls 41, and the cutter part 37 of the cutting tool 3 that is adjacent to the cutter 7 bearing on the supporting surface 19 of the supporting body.

As can also be seen from the figures, the fixing part 35 of the block-shaped cutting tool 3 has, overall, a wedge shape that matches the V-shaped receiving cross-section of the seat 21, the wedge shape being rounded off in the lower vertex region 39. The side walls 41 of the fixing part 35, which extend in diverging manner from the vertex region 39, have surface regions that face away from the flat shape, or have a certain domed shaping, for optimum bearing contact on the seat walls 25. As shown by FIGS. 1 and 2, at the base 23 of the recess constituting the seat 21 the ends of the seat walls 25 are separated from each other by an opening 43 in the form of a partial bore, such that a clearance between the holder 1 and the vertex region 39 of the cutting tool received in the seat 21 is produced at the base 23.

Figure 3:
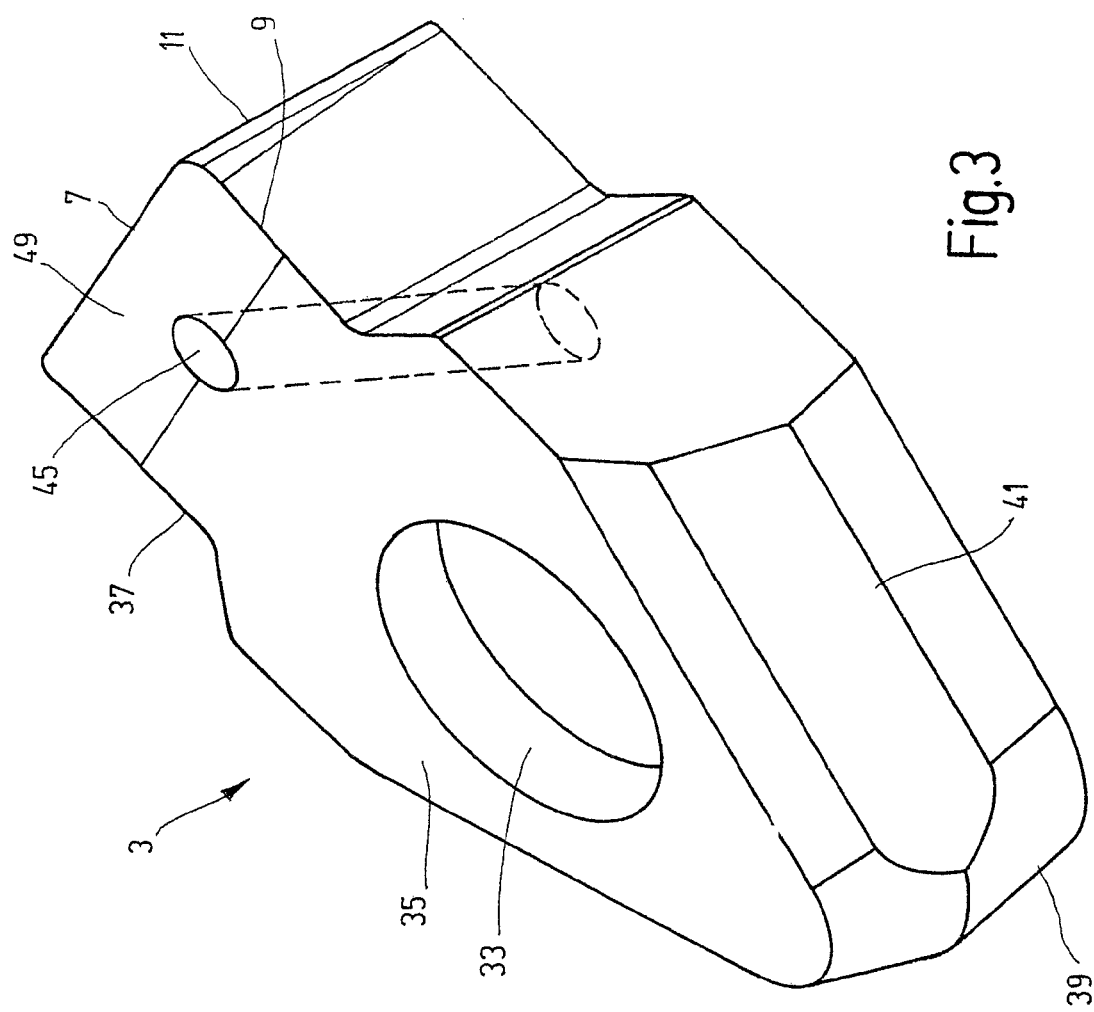
FIG. 3 shows, in yet larger scale, a perspective oblique view of only a cutting tool for use in the case of the tool system according to the invention.

As shown by FIG. 3, the cutting tool 3 has a channel 45 for a cooling lubricant, the channel 45 opening in proximity to the main cutter 7. When the cutting tool 3 has been received in the seat 21, the entry of the channel 45 is located at the outlet opening 47 of a supply line (not shown) provided in usual manner in the holder 1.

Figure 5:
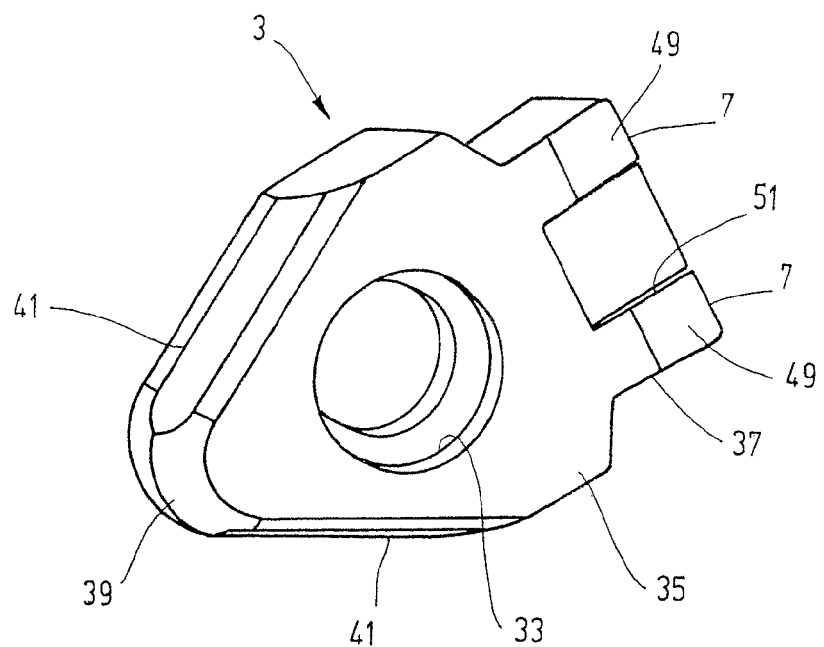
FIGS. 4 and 5 show, drawn in approximately the same scale as FIG. 2, perspective oblique views of two differently shaped cutting tools for the tool system according to the invention.
Figure 4:
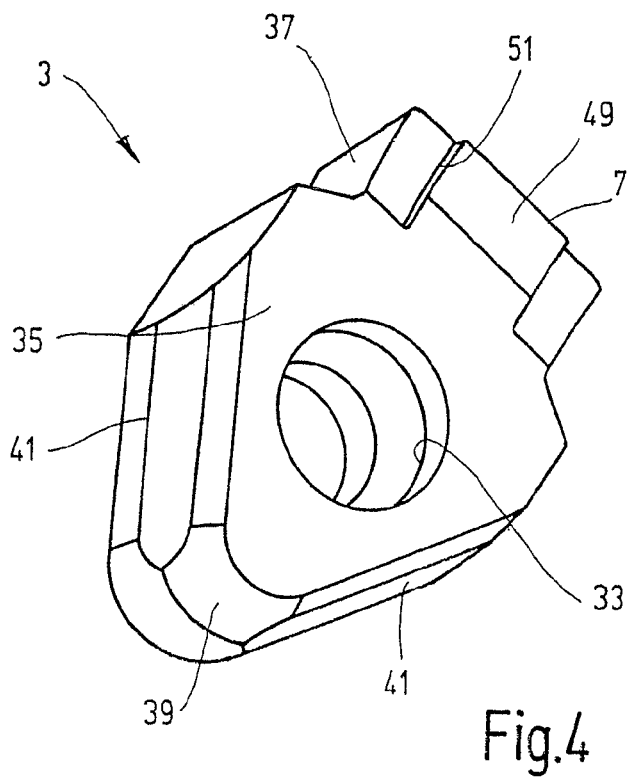

FIGS. 4 and 5 show two differing designs of the main cutter 7 of the cutting tool 3. Whereas, in the case of the example of FIG. 4, there is a centrally located main cutter 7 adjoined by the laterally set-back peripheral regions of the cutter part 37, in the case of the example of FIG. 5 the main cutter is divided into two lateral cutters 7, between which there is a set-back central part of the cutter part 37. As can also be seen from FIGS. 4 and 5, the respective cutter 7 is not adjoined by a planar surface portion, but by a cutting face 49, which has a slightly shovel-shaped curvature 51, in order to promote optimum chip shaping during the working operation.

I claim:

1. A tool system comprising
a holder and
a cutting tool that has a tool cutter and a fixing part, the tool cutter, for the purpose of chip-removing machining, projecting beyond the outer circumference of the holder by a predefinable projecting length,
the holder being provided, on its outer circumference, with a supporting part that projects in the direction of the projecting length of the tool cutter and constitutes a supporting surface for at least partial bearing contact of the cutting tool,
the holder having the shape of a shank that defines a longitudinal axis, the supporting part being constituted by a supporting body that projects radially, relative to the longitudinal axis, from the circumferential surface of the shank and is realized as a single piece with the latter,
the shank constituting, at least at its free end, a recess as a seat for receiving a fixing part of the cutting tool, which recess is open at the end face of the shank and on the circumference of the shank,
wherein the cutting tool, at least over the greater portion of the fixing part, has an overall wedge-shaped outline with side walls that, starting from a vertex region opposite the tool cutter, diverge in a V shape,
wherein the seat of the holder, for the purpose of acting in combination with the side walls of the fixing part of the cutting tool, has side walls having a configuration that diverges radially outwards and, at least partially, likewise in a V shape from a recess base, and
wherein the vertex region of the cutting tool is at a predefinable clear distance from the bottom of the recess base.

2. The tool system as claimed in claim 1, wherein the radially outwardly diverging seat walls of the holder open out, in the direction of the longitudinal axis of same, into the recess base, which has an inner wall that is widened in comparison therewith, preferably extends in the form of an arc and is part of the bottom of the recess base.

3. The tool system as claimed in claim 2, wherein the diameter of the arc for the recess base is selected to be greater than the clear entry cross-section into which the V-shaped seat walls open out into the recess base.

4. The tool system as claimed in claim 2 or 3, wherein the recess base is arranged adjacently to the longitudinal axis of the holder, or the longitudinal axis goes through the bottom of the recess base, or extends within the clear opening of the recess base.

5. The tool system as claimed in any one of claims 1 to 3, wherein the supporting body adjoins the seat axially in such a way that its supporting surface facing towards the front end face of the shank constitutes a continuation of the rear end surface of the seat, which continuation projects beyond the circumference of the solid of revolution.

6. The tool system as claimed in claim 5, wherein the fixing part of the cutting tool has a flat bearing contact surface for positive bearing contact on the flat, rear end surface of the seat and on the supporting surface of the supporting body, which supporting surface is a continuation of this end surface.

7. The tool system as claimed in claim 6, wherein the bearing contact surface of the fixing part, the rear end surface of the seat and the supporting surface of the supporting body that adjoins the latter are located in a radial plane, for the purpose of absorbing force components of the cutting force that act along the longitudinal axis.

8. The tool system as claimed in claim 5, wherein the cutting tool has the shape of a block, preferably formed from a hard metal material, the cutter part of which constitutes a continuation of the fixing part, the continuation being shaped in such a way that it constitutes the projecting length of the tool cutter beyond the holder and the supporting body, and the continuation, via its end surface as part of the bearing contact surface, acting in combination with the supporting surface of the supporting body, and the tool cutter having at least one cutting edge that is located on or near the front side of the cutter part that faces towards the end face.

9. The tool system as claimed in claim 8, wherein there is at least one main cutter, which extends, on the front side of the continuation, in a plane parallel to the supporting surface.

10. The tool system as claimed in claim 9, wherein the front side of the continuation has, adjoining the main cutter, a cutting face having a slight curvature.

11. The tool system as claimed in any one of claims 1 to 3, wherein the side walls of the fixing part of the cutting tool that act in combination with the seat walls have sub-regions deviating from the plane.

12. The tool system as claimed in claim 11, wherein the base of the recess of the shank constituting the seat has an opening constituting a distance from the vertex of the wedge shape of the fixing part and/or the vertex region of the fixing part has a shortening producing this distance.

* * * * *